Dec. 8, 1931.  L. C. KARRICK ET AL  1,835,878
LEACHING AND TREATING APPARATUS
Filed Jan. 6, 1925  2 Sheets-Sheet 1

INVENTORS
Lewis C. Karrick and Douglas Gould
by J. M. Thomas

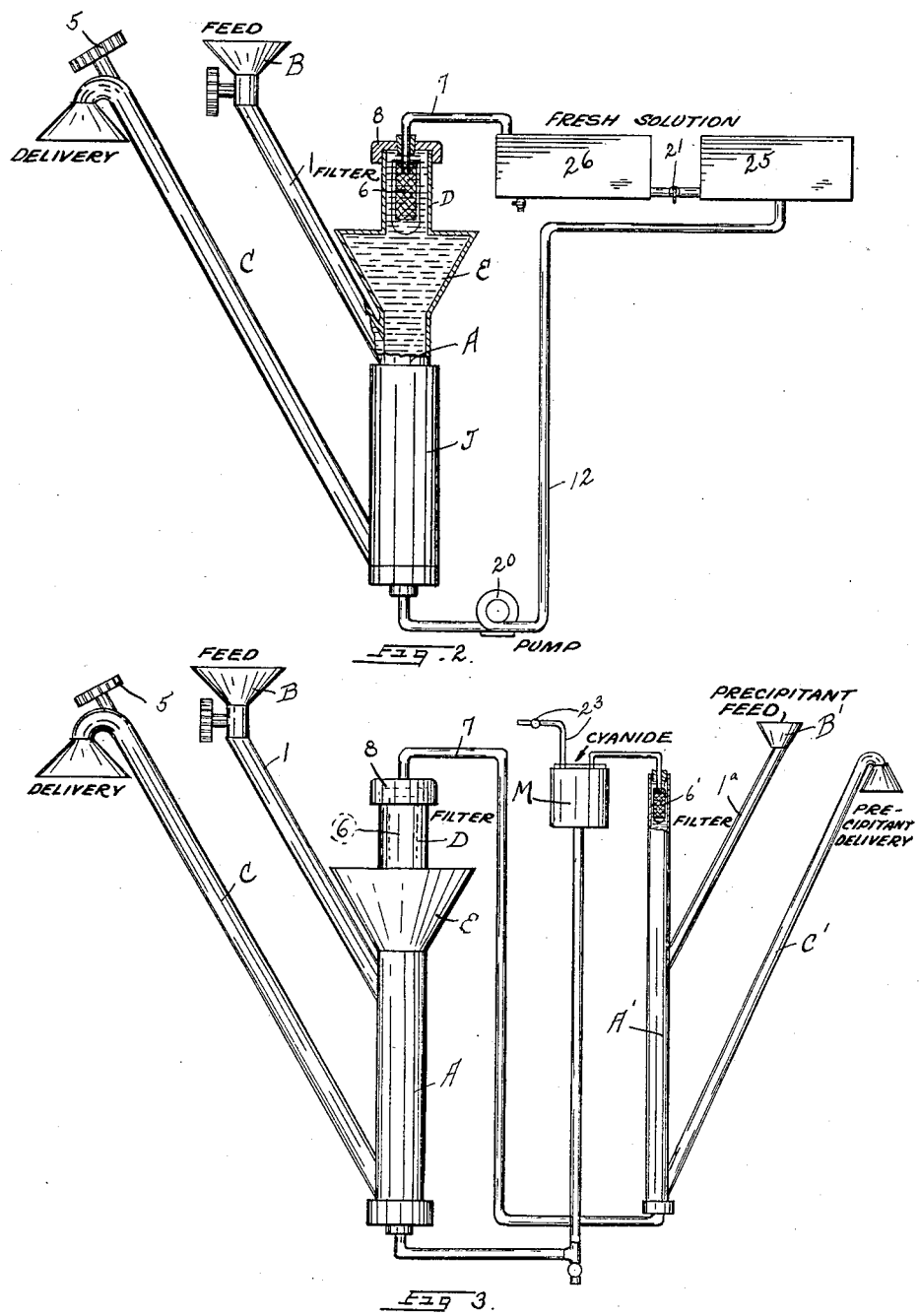

Patented Dec. 8, 1931

1,835,878

UNITED STATES PATENT OFFICE

LEWIS C. KARRICK, OF SALT LAKE CITY, UTAH, AND DOUGLAS GOULD, OF BOULDER, COLORADO

LEACHING AND TREATING APPARATUS

Application filed January 6, 1925. Serial No. 921.

Our invention relates to an apparatus invented for the purpose of efficiently leaching and extracting soluble materials from solid substances, or for the purpose of efficiently treating liquid substances with solid materials and reagents, or for treating liquid substances with reagents.

It is an apparatus wherein comminuted material moving continuously therethrough is subjected to a counter-current flow of liquid or solvent for the purpose of recovering certain soluble substances from the comminuted material, or wherein a liquid containing certain impurities or valuable dissolved salts or compounds, moving continuously, is subjected to a counter-current flow of solid comminuted material and/or reagents for the purpose of removing certain impurities from said liquid by reaction with the comminuted materials and/or reagents, and further it is an apparatus in which is provided a settling zone or chamber between the mass of solid comminuted materials and a reagent, and the filter, said settling zone or chamber being provided for the purpose of retarding the velocity of flow of the liquid so as to permit a great portion of the fine particles of comminuted material to settle out before the filter is reached, and thus the apparatus has great capacity for efficient and perfect leaching, treating and filtering.

A further object of our invention is to provide, in the counter-current flow principle of the apparatus, means whereby compacting of the comminuted material and clogging of the filter are prevented.

The objects and functions of our invention we accomplish with the apparatus illustrated in the accompanying drawings in which similar letters and numerals of reference indicate like parts throughout the several views, and as described in the specification forming a part of this application and pointed out in the appended claims.

In the drawings we have shown the most important features of our invention.

Figure 2 is an embodiment of the principal features of our invention in a form suitable for the process of oil bleaching or refining by the use of solid reagents and/or activated clays, activated charcoal, and fuller's earth hereafter referred to as gangue.

Figure 1:
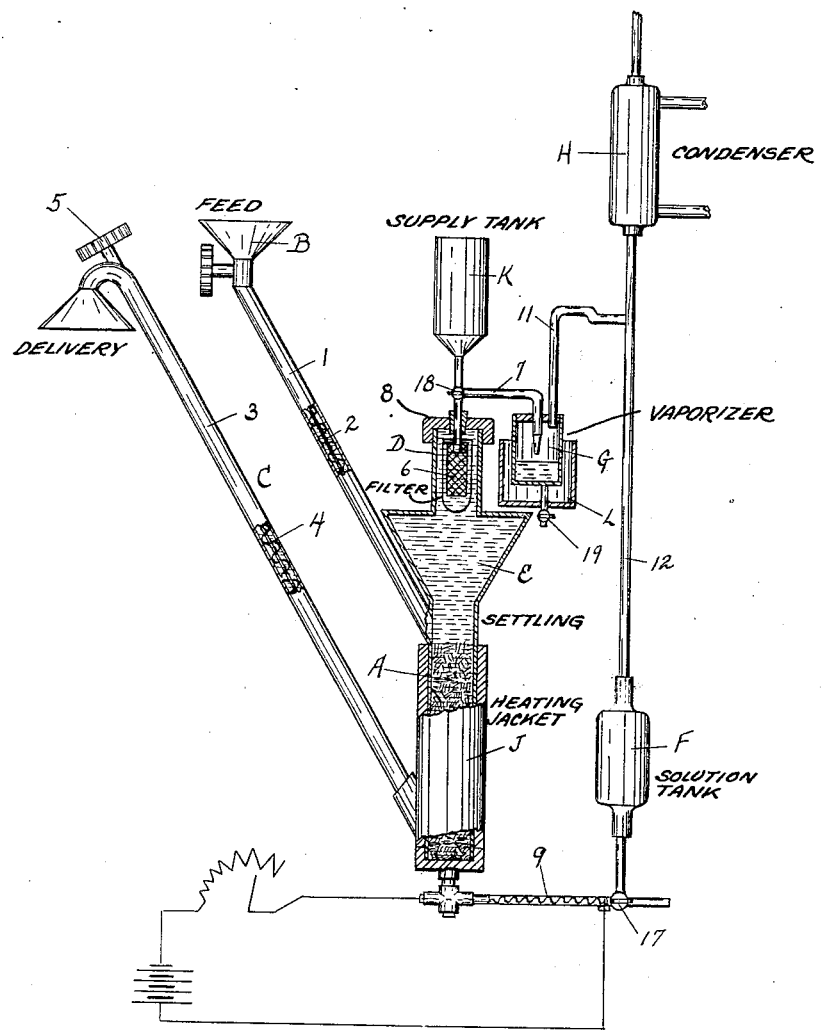
Figure 1 is a vertical section of the apparatus with some of the parts shown in elevation. This drawing illustrates our apparatus for use in leaching or extracting, by means of a low boiling solvent, certain soluble materials from a comminuted material, such as oil sands.

Figure 3 is a modification of our invention in a form suitable for the leaching or lixiviation of metalliferous ores in which a comminuted ore is caused to flow counter-current to a cyanide solution, a sodium sulphide solution, etc. The solution after passing through the apparatus will pass into a second similar apparatus of suitable size, and in the second apparatus flow counter-currently to a moving mass of finely divided zinc, copper, or other precipitant, on which the dissolved rare metals will be precipitated. This form of apparatus also will be adapted to the continuous leaching of salt laden earths.

In all cases it is understood that the liquid is made to pass upward through the moving mass of solid material provided that the solid material has a greater density than the liquid in contact.

It is often the case that in leaching or treating finely divided substances, difficulties are encountered by clogging of the filtering elements if the flow of the solvent and material are both downward or in the same direction. This is caused by the tendency of the material to form into a compact mass wherein the slimes fill what otherwise would be voids in the mass of the coarser particles of the material under treatment. These difficulties we have overcome by our invention which consists of an extraction, leaching or treating chamber or receptacle A, having a feed hopper B placed above the hydraulic-head or liquid level which is determined by the flow pipe 7 of the apparatus and said hopper is operatively connected to the apparatus by the pipe 1 and the feed screw 2. The screw 2 regulates the supply of solid material as it is delivered to the apparatus. The solid material or gangue after passing down through the extraction, leaching or treating chamber A is carried from the lower portion of said chamber, by the elevator C, which consists of a pipe 3, with a screw conveyor 4, which is rotated therein by the power driven gear 5.

A settling chamber E is secured above the chamber A and at a point just above the point of introduction of material fed into the apparatus by the pipe 1. The chamber E increases in cross section in the direction of flow of the liquid so that the velocity of flow of the liquid will decrease and prevent most of the fine particles of solid materials from reaching the filter element 6 and clogging the filter.

On the upper end of said chamber E are secured the filtering parts of our apparatus, said filter parts consisting of a cylindrical vertically placed thimble 6, made of any suitable filter fabric or material and having an outlet pipe 7 at its upper end which conducts the filtered or treated liquid from the filter chamber D. The filter chamber D is integrally formed on the upper end part of the chamber E. A cap or cover 8 is secured on the upper end of the filter chamber D which cap supports the said pipe 7 and the filter 6 and closes the upper end of the chamber D.

A solution tank F is connected with the lower part of the chamber A by the pipe 9. This tank provides a ready supply of clean working liquid for cleaning the filter in the event it becomes clogged. To do this the two way valve 17 is turned so that the contents of the tank F flows out into a bucket or receiver and the valve is again turned to its normal operating position. The liquid in then manually transferred to tank K and a valve 18 turned so the liquid in tank K will pass into the filter chamber D through the filter in the reverse direction, thus releasing any filter cake. When the tank K is emptied, the tank F being full the valve 18 can be reversed and the operation resumed.

When leaching is done with a low boiling solvent, we make use of the solvent vaporizer or regenerator and extract recovery device G, shown in Figure 1. The solvent containing the soluble extract passes from the filter 6 into the vaporizer G by the pipe 7. Heat is supplied by the heat jacket L and the solvent vaporized. The vapor passes out by the pipe 11 and into the condenser H where the condensate refluxes back through the pipe 12 into the tank F and into the chamber A, thus making the cycle continuous. The extract from the material being leached accumulates in the vaporizer G but is drawn off at intervals by the valve 19 when concentration warrants its removal, and the equivalent volume of fresh solvent is introduced into the apparatus through the pipe 3, as by rotating the funnel shown at its upper end to position to receive the added solvent.

The operation of our apparatus for leaching with low boiling solvents is as follows (see Figure 1):—The material to be treated is fed into the apparatus through the feed hopper B and pipe 1. As it passes downward through the receptacle A it is leached efficiently by the counter-current flow of the solvent, depending on the rate of feed and the rate of flow of the solvent. The solvent with the extracted material rises through the settling space E where particles of suspended material are permitted to drop out and then through the filter 6 and into the vaporizer G. Heat supplied to the vaporizer by the heating jacket L evaporates, continuously, the solvent which passes out to the condenser and is returned continuously through the pipes 12 and 9 to the extraction receptacle A. The solid material passes to the bottom of the chamber A and is withdrawn from the apparatus by the elevating screw 4. The returned solvent may be heated as it passes through the pipe 9 by the heating element therein.

The operation of our apparatus for bleaching or treating oils is as follows (see Figure 2):—The oil to be treated is charged into the tank 25 and is caused to flow at the proper rate by the centrifugal pump 20 into the treating chamber A where it passes upward successively through chambers A, E, and D, thence through filter 6 and to the tank 26 provided for receiving the treated liquid. If it is desired to recycle the oil, the valve 21 is opened and the oil passes into the tank 25 and repeats the cycle of treatment. The comminuted bleaching and treating material such as dry reagents and activated clays, activated charcoal and fuller's earth, are fed into the apparatus through the hopper B and the pipe 1, and pass downward counter current to the upwardly flowing oil, thus providing intimate contact between the treating substances and the material being treated. The treating substances if supplied at the proper rate will have lost most of their effectiveness as treating substances by the time they reach the bottom of chamber A, and are then removed from the apparatus by the elevating screw 4. A heating jacket J is provided around the chamber A in order that the temperatures most effective in aiding the reactions can be maintained.

The operation of our apparatus for the lixiviation of ores is as follows (see Figures 1 and 3):—The ore to be treated by leaching or lixiviation is fed into the apparatus through the feed hopper B and the pipe 1 by screw 2. As it passes downwardly through the receptacle A it is leached by the counter current flow of the solution, and then passes out of the apparatus by the elevating screw 4. The solvent carrying the dissolved material rises through the settling space E, where suspended particles are dropped, and then through the filter 6. The solution then passes into the bottom of a second similar apparatus A', where it rises counter current through a descending mass of finely divided material through the pipe A', which material acts as a precipitant for the rare metals in the solution, and on reaching the top of said pipe A' is filtered as it passes to the tank M of the apparatus. Fresh cyanide or other reagent is added at M by the pipe 23, and the revived solution recycled. The precipitant material passes into the apparatus at B' and out by the elevator pipe C'.

Having thus described our invention and its operation we desired to secure by Letters Patent and claim:—

1. An apparatus comprising a vertically disposed cylinder through a portion of which comminuted solids may be vertically passed; a pipe connected with the lower portion of said cylinder through which a liquid solution may be introduced to said cylinder; a screened outlet from the upper portion of said cylinder through which said liquid flows after passing through the comminuted solids in said cylinder; a vaporizer connected with said screened outlet; and a supply tank in operable connection with said outlet and inlet of said cylinder.

2. An apparatus comprising a liquid holding receptacle with the medial portion enlarged and given a conical shape; means for passing a continuous flow of comminuted solids downwardly through said receptacle below said enlarged portion; means for filtering liquid in its exit from said receptacle; means to introduce heated liquid at the lower end of said receptacle; and a generator and condenser in the circuit of flow of liquid from the exit to the inlet of said receptacle.

3. An apparatus comprising a vertically disposed cylinder through a portion of which comminuted solids may be passed vertically downward; a pipe connected with the lower portion of said cylinder through which a liquid solution may be introduced to the said cylinder; means to heat said solution; a second outlet from the upper portion of said cylinder through which said liquid flows after passing through the comminuted solids in said cylinder; a vaporizer connected with said screened outlet; and a supply tank in operable connection with said outlet and inlet of said cylinder.

4. An apparatus comprising a vertically disposed cylinder through a portion of which finely divided material may be passed in a downward direction, either intermittently or continuously; a pipe connected to the lower portion of said cylinder through which a heated liquid or solution may be introduced into the said cylinder; a screened outlet from the upper portion of said cylinder through which said liquid or solution flows after passing upward through the finely divided material in said cylinder; a solvent regenerator and extract-recovery device in the circuit of flow of the liquid or solution from the exit to the inlet of said cylinder.

5. The process of leaching material which consists in feeding the material in small pieces downwardly through a rising current of liquid, passing the liquid upwardly through a filter, passing the filtered liquid to an evaporating vessel, evaporating the liquid in the vessel, to separate it from dissolved substances, and condensing the resulting vapor.

6. The continuous process of leaching material which consists in feeding the material in small pieces downwardly through a rising current of liquid, removing the leached material by a side channel, passing the liquid through a filter after it has passed the material, passing the filtered liquid to an evaporating vessel, evaporating the liquid in the vessel to separate it from dissolved substances, condensing the resulting vapor, and returning the condensate to the bottom of the rising current.

In testimony whereof we have affixed our signatures.

LEWIS C. KARRICK.
DOUGLAS GOULD.